C. D. MASON.
RUBBERIZED SHEET FOR TRUNK PANELS AND THE LIKE.
APPLICATION FILED SEPT. 22, 1916.
1,209,986.  Patented Dec. 26, 1916.
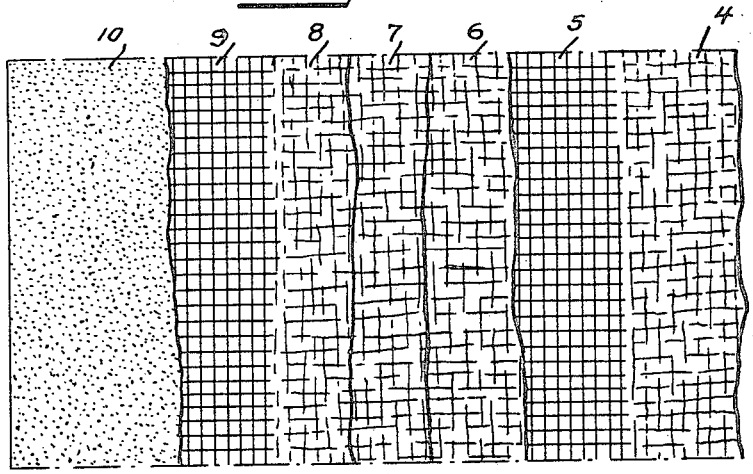
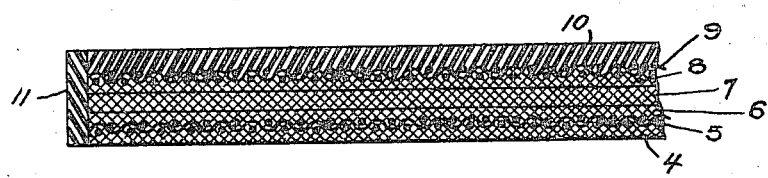
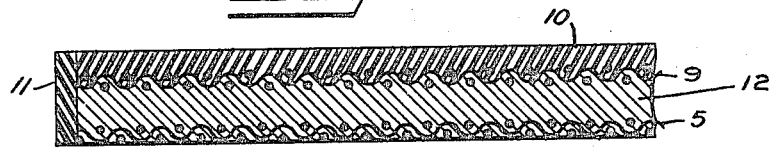
WITNESS:
INVENTOR
Claude D. Mason,
BY
HIS ATTORNEY

UNITED STATES PATENT OFFICE.

CLAUDE D. MASON, OF NAUGATUCK, CONNECTICUT, ASSIGNOR TO THE GOODYEAR'S METALLIC RUBBER SHOE COMPANY, A CORPORATION OF CONNECTICUT.

RUBBERIZED SHEET FOR TRUNK-PANELS AND THE LIKE.

1,209,986. Specification of Letters Patent. Patented Dec. 26, 1916.

Continuation of application Serial No. 15,694, filed March 30, 1915. This application filed September 22, 1916. Serial No. 121,539.

*To all whom it may concern:*

Be it known that I, CLAUDE D. MASON, a citizen of the United States, and a resident of Naugatuck, county of New Haven, and State of Connecticut, have invented certain new and useful Improvements in Rubberized Sheets for Trunk-Panels and the like, of which the following is a full, clear, and exact description.

This invention relates to rubberized sheets for trunk panels and the like and is more particularly directed to sheets of the kind mentioned employing a reinforcing material, for example woven wire-cloth interiorly thereof.

One of the objects of the invention is to provide a sheet which shall possess a relatively high tensile strength and resistance to wearing.

Another object is to provide a sheet which shall be waterproof.

Another object is to provide a sheet of the kind described which may be formed in a given shape for example by molding without weakening the resultant structure.

This application is a continuation of my former application, Serial No. 15,694, filed March 30, 1915.

In the accompanying drawings in which is shown one embodiment of the invention Figure 1 represents a plan view of a portion of a sheet broken away so that the faces of successive plies are revealed; Fig. 2 is an enlarged cross-sectional view of the sheet; and Fig. 3 is an enlarged cross-sectional view of a modified form of sheet.

In the manufacture of sheets in their preferred form, referring to Figs. 1 and 2 of the drawings, a ply of Hessian or similar coarse cloth 4, provided on one side only with a friction-coat of rubber, is first laid down. On this as a base there are superimposed successively a ply of woven wire-cloth 5, three plies of fabric 6, 7 and 8, frictioned on both sides with rubber, and a second ply of wire-cloth 9. The structure as thus built up is placed in a hydraulic press where it is subjected for about five minutes to a pressure sufficient to force the rubber through the meshes of the fabric and wire-cloth thereby causing the several parts to adhere firmly to each other. The compacted structure is then removed from the press and is provided with a skim-coating of rubber 10 applied over the upper face of the second ply of wire-cloth 9. This layer of rubber may be suitably colored to give for example the appearance of tanned leather. If the material is to be used as a panel or the like it is then cut and placed in a form for vulcanization. The material is preferably cut slightly smaller than the form and the space between the sides thereof and those of the form is filled with a skim-coating compound 11 similar to the compound 10. The compound 11 thus serves to cover the ends of the wire, fabric, etc., and to provide a panel with smooth clean cut edges. The panel having been placed in the form as indicated is vulcanized under pressure. In case it is desired to vulcanize the material in sheet form this may be done while it is undergoing compression as indicated above. Otherwise, as in making panels, vulcanization is preferably conducted in a second press, the material being maintained at a temperature of approximately 286° F. for a period of approximately two hours. The simultaneous heating and compression causes the rubber contained in the various plies to unite and cure into a unitary structure, the plies of the fibrous material and the wire-cloth being thereby embedded in the vulcanized rubber. The resulting sheet it will be observed provides an under surface of cloth which has not been treated by frictioning or otherwise with rubber. This surface is suitable for the attachment by an adhesive of linen or other material which may be employed as a lining for the trunk.

Referring to the embodiment shown in Fig. 3 there is shown a similar construction in which a composition of rubber and desiccated fibers 12 is employed in place of the Hessian cloth or burlap. In manufacturing this sheet a sheet of a compound of rubber and vegetable or other fiber about 3/16" thick is placed between plies of woven wire cloth 5 and 9 and the whole compacted for about five minutes in a hydraulic press. The resulting sheet is then skim-coated and its edge covered if desired as indicated in connection with the sheet shown in Figs. 1 and 2. The whole is then replaced in the press and cured for approximately one hour and twenty minutes at about 286° F. By this curing the rubber fills the interstices of the wire-cloth 5 so that it is firmly embedded in the composition. On the opposite side of the panel a skim-coat 10 and the sheet 11 unite to embed the ply of wire-cloth 9 therein. The panel constructed according to the treatment just described is stiffer than that formed according to the embodiment previously set forth. It is particularly useful for trunks which receive unusually hard usage. For small light trunks and similar baggage, however, the construction shown in Figs. 1 and 2 is preferable.

It will be observed that instead of applying the layers of woven wire-cloth 5 and 9 so that their strands are substantially parallel to one another as shown in the embodiments heretofore described I may also apply one of the layers of wire-cloth so that the strands thereof are disposed on the bias or oblique to those of the other ply. Such arrangement of the wire-cloth serves to provide an even stiffer material.

The arrangement of the woven wire cloth within the composite sheets, as above set forth, produces an unusual degree of stiffness by reason of the fact that any bending movement, which is produced by reason of rough usage to which the material may be subjected, is resisted by two separate layers of metallic reinforcements which coöperate with each other to prevent elongation at the convex surface of a bend and compression at the concave surface of a bend. The medial line of bending within the body of the material in any particular direction is separated as far as possible from the reinforcing layers of woven wire-cloth, thereby giving the greatest leverage to prevent undue bending. However, the filaments or strands of the wire cloth being crimped in the process of manufacture, enables the material to be slightly elastic up to a certain point, beyond which the wire prevents further bending. This action will not be present where a single strand layer of wire-cloth is embedded centrally in the composite sheet.

Having thus described my invention what I claim and desire to protect by Letters Patent is:

1. A broad flat sheet of material adapted to be used as a trunk panel or the like comprising layers of wire-cloth embedded in and forming a unitary structure with layers of rubber and rubberized fabric.

2. A broad flat sheet of material adapted for use as a trunk panel or the like comprising separated layers of woven wire-cloth, layers of rubberized fabric therebetween, layers comprising rubber covering the outer faces of said layers of wire-cloth and a layer of rubber covering the edges thereof.

3. A broad flat sheet of material adapted for use as a trunk panel or the like comprising two layers of woven wire-cloth, layers of rubberized fabric therebetween, and layers comprising rubber covering the outer faces of said layers of wire-cloth, said layers of wire cloth being disposed on either side of the medial line of bending within the material.

Signed at Naugatuck, Connecticut, this 15th day of September, 1916.

CLAUDE D. MASON.